(12) United States Patent
Caridis et al.

(10) Patent No.: US 6,413,566 B2
(45) Date of Patent: Jul. 2, 2002

(54) SIMULTANEOUS SLICING AND WASHING OF VEGETABLES

(75) Inventors: Andrew A. Caridis, San Carlos; John Silvester, Hayward; Daniel E. Brown, San Mateo; Leonardo P. Murgel; Carl Beitsayadeh, both of San Francisco; Anthony A. Caridis, Belmont; Anthony Wade Morris, San Leandro, all of CA (US)

(73) Assignee: Heat and Control Inc., Hayward, CA (US)

( * ) Notice: Subject to any disclaimer, the term of this patent is extended or adjusted under 35 U.S.C. 154(b) by 0 days.

(21) Appl. No.: 09/795,787

(22) Filed: Feb. 27, 2001

Related U.S. Application Data

(63) Continuation-in-part of application No. 09/366,659, filed on Aug. 3, 1999, now abandoned.

(51) Int. Cl.[7] .............................. A23P 1/00; B26D 7/00
(52) U.S. Cl. .............................. 426/518; 83/22; 83/98; 83/165; 83/932; 426/506
(58) Field of Search ............................ 426/518, 506; 83/22, 24, 98, 165, 112, 932

(56) References Cited

U.S. PATENT DOCUMENTS

| | | |
|---|---|---|
| 2,178,920 A | 11/1939 | Savery |
| 4,138,940 A | 2/1979 | Fujii |
| 4,139,647 A | 2/1979 | Douglas |
| 4,590,829 A | 5/1986 | Davidson et al. |
| 4,852,441 A | 8/1989 | Anders et al. |
| 4,945,794 A | 8/1990 | Quo et al. |
| 5,042,342 A | 8/1991 | Julian |
| 5,168,784 A | 12/1992 | Foster et al. |
| 5,179,881 A | 1/1993 | Frey et al. |
| 5,394,793 A | 3/1995 | Julian et al. |
| 5,435,714 A | 7/1995 | Van Lengerich et al. |
| 5,694,824 A | 12/1997 | Jacko et al. |
| 6,116,130 A | 9/2000 | Cogan |

*Primary Examiner*—George C. Yeung
(74) *Attorney, Agent, or Firm*—Donald N. MacIntosh; Flehr Hohbach Test Albritton & Herbert LLP

(57) ABSTRACT

Simultaneous slicing and washing of relatively firm raw vegetable or fruit products is accomplished in a vat of water into which a slicer apparatus is positioned such that the slices are formed and discharge directly into the water. An inclined takeout conveyor serves to receive the slices and remove them from the water. A circulating water current and fluid jets urge the slices to disperse onto the conveyor. A spray of water or air blast removes residual vegetable matter from the slice surfaces before leaving the takeout conveyor for further processing. Slicing and washing a vegetable in a flume volute where the slices are dispersed onto a takeout conveyor is disclosed where the water medium is collected in a tub and recycled back to flow in the flume to a level that covers the slicer's operative parts. The apparatus may be used for simultaneous slicing and cooking of raw vegetables where hot cooking oil is maintained in the system and recycled for reheating.

23 Claims, 7 Drawing Sheets

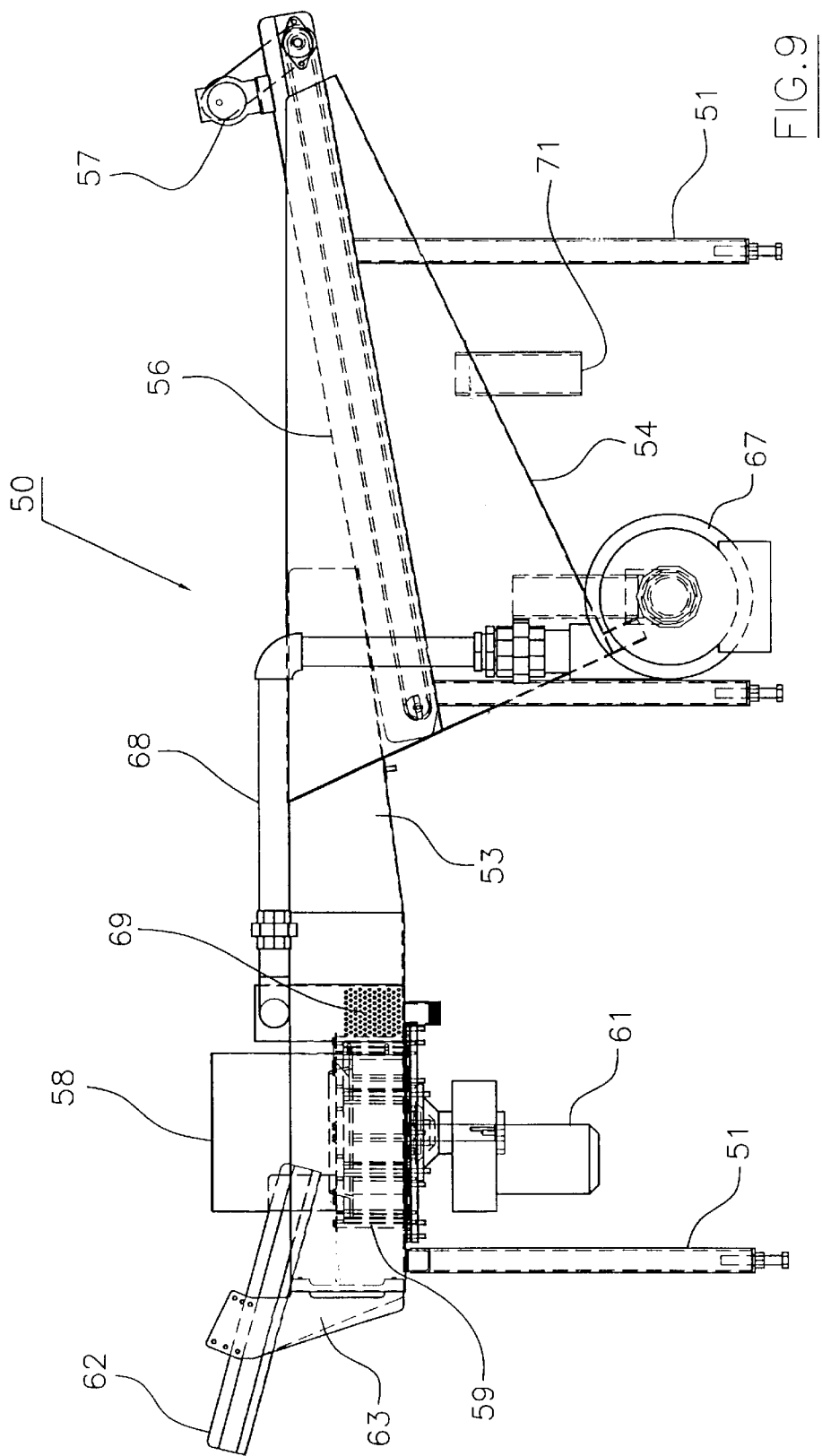

SIMULTANEOUS SLICING AND WASHING OF VEGETABLES

This is a continuation-in-part application of Ser. No. 09/366,659, filed Aug. 3, 1999, entitled 'Simultaneous Slicing and Washing of Vegetables', now abandoned.

FIELD OF THE INVENTION

This invention is generally directed to the field of preparation of vegetable such as potatoes, plantains and the like prior to frying, baking or drying and more specifically relates to slicing a vegetable product to the desired thickness and simultaneously washing the sliced vegetable for removal of starch, ruptured cells and the like.

BACKGROUND OF THE INVENTION AND PRIOR ART

In the process for the preparation of potato chips, for example, it is commonly found that the potatoes are first treated to the gross removal of dirt from the whole potatoes. Then the potatoes may undergo skin removal in a peeler, although this is not always the case, and are then forwarded to a slicer which cuts the potatoes to the desired thickness, usually on the order of 0.60 inches thickness. In the slicing operation the potato body is penetrated by a metal blade which ruptures the vegetable cells and leaves a residue or film of starch and broken cells dispersed over the surfaces of the slices. The presence of the film is undesirable in subsequent processing steps such as frying or baking although for certain chip styles the presence of the film of starch is tolerated. However, washing the slices in a water bath is the common practical method of cleaning the starch and ruptured cell film from the slices. In that step, the slices are deposited into the water bath either directly from the slicer or from a conveyor belt which carries the slices from the slicer outlet located remotely from the bath. The bath for washing the slices may have agitation supplied therein to promote a vigorous action of the water upon the surfaces of the slices to achieve effective removal of the starch film. The washed slices were removed from the bath typically upon an inclined conveyor and when removed from the water may then be subjected to water sprays and/or an air blast to remove residual starch particles and water film from the surfaces of the slices. Thus prepared, the potato slices are advanced to additional processing steps leading toward the desired finished products, usually fully cooked chips.

French-fried potatoes in their preparatory processing steps undergo a step of cutting the whole potatoes into strips generally sized to resemble the finished fried product. A successful method of potato strip cutting has been to propel, such as by pumping, the potatoes in a fast-moving charge of water against and through a fixed, crisscross array of knives or other potato cutters. This splits the potatoes into strips in the presence of water employed to drive the vegetables through the knives or other cutters. See U.S. Pat. No. 5,042,342 to Julian assigned to Lamb-Weston, Inc. of Kennewick, Wash.; U.S. Pat. No. 5,168,784 to Foster et. al assigned to Universal Frozen Foods, Inc. of Twin Falls, Id.; and U.S. Pat. No. 5,179,881 to Frey et. al. assigned to McCain Foods Ltd. of Florenceville, Canada.

One important objective of this invention is to eliminate the separate washing step following slicing in vegetable processing through combining the slicing and washing step for efficient removal of starch film from the sliced pieces.

SUMMARY OF THE INVENTION AND OBJECTS

In summary the invention resides in a process of simultaneously washing and slicing a raw vegetable such as potatoes, apples, sweet potatoes, cassava, plantains, beets, onions, water chestnuts, carrots, turnips, cabbage and sugar beets and the like, the process including the steps of providing a flume or vat of washing water equipped with an inclined takeout conveyor positioned with its lower end submerged in the water and its upper end extending above the water surface, positioning a vegetable slicer with its product reception inlet above the water surface and its slice discharge outlet positioned below the water surface. The vegetables are supplied to the slicer inlet as it is operating so that the slices are discharged underwater serving to directly and forcefully clean the slice surfaces of dirt, starch and burst cells. The water is circulated in a current at a force such that the slices are urged toward or attracted to and dispersed upon the conveyor which is operated to remove the slices from the wash water for further processing.

An object of the invention is to provide an improved process for the preliminary preparation of slice-able vegetables wherein the washing and slicing steps may be undertaken simultaneously thereby effect a savings in processing time and equipment expense.

Another object of the invention is to provide an efficient combined processing step of slicing, washing and dispersing the washed slices on a takeout conveyor in an arrangement which minimizes slice overlap thereby reducing the tendency to form clumps of the sliced product in subsequent cooking including frying steps.

Yet another object of the invention is to provide for the substantially complete removal of slices from the slice washing bath irrespective of the vortexes or turbulence therein.

Still another object of the invention is to provide a process for economical slicing and washing of potatoes preparatory to frying which is efficient in the use of equipment and time and is labor saving.

Additional objects and features of the invention will be readily understood and appear below in the drawings and description of preferred embodiments of our invention.

BRIEF DESCRIPTION OF THE DRAWINGS

FIG. 9 is an elevation view, partially broken away, of the apparatus shown in FIG. 7.

DESCRIPTION OF THE PREFERRED FORMS OF THE INVENTION

Figure 1:
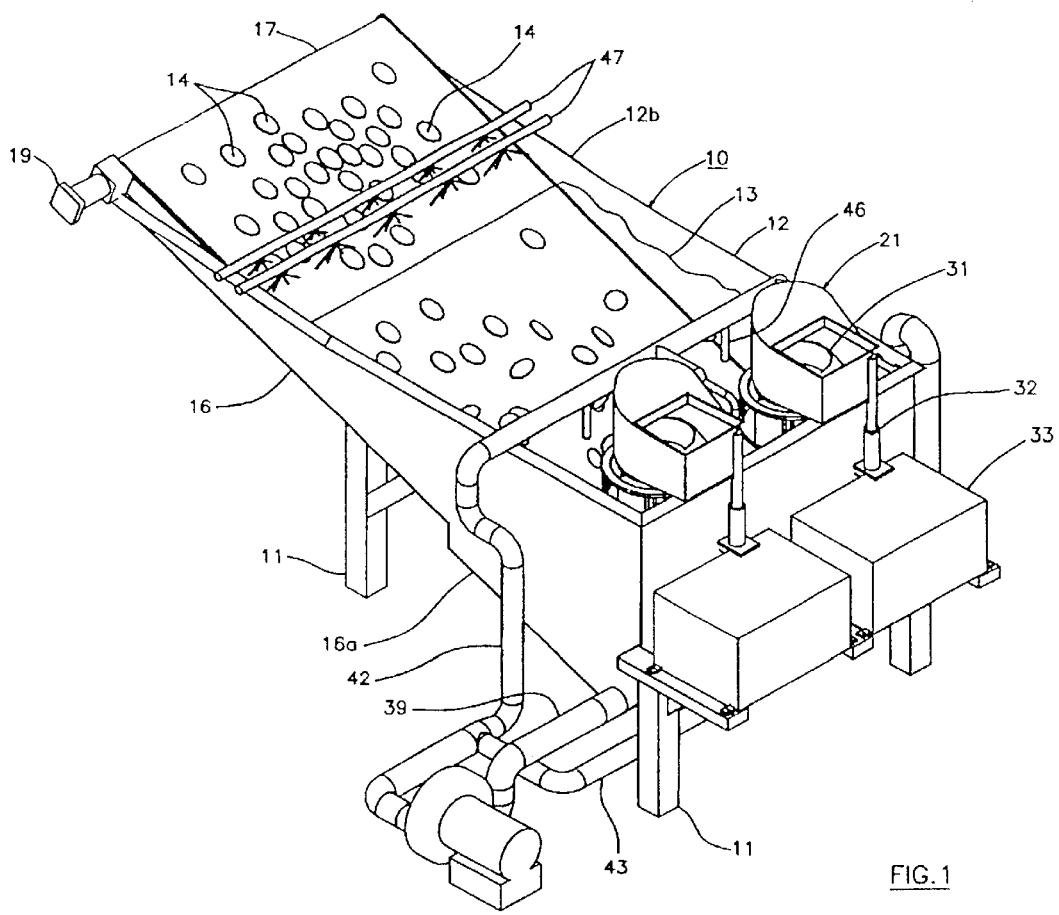
FIG. 1 is an isometric view from above showing a vegetable slicing and washing apparatus specifically adapted for practicing the process of the present invention.
Figure 2:
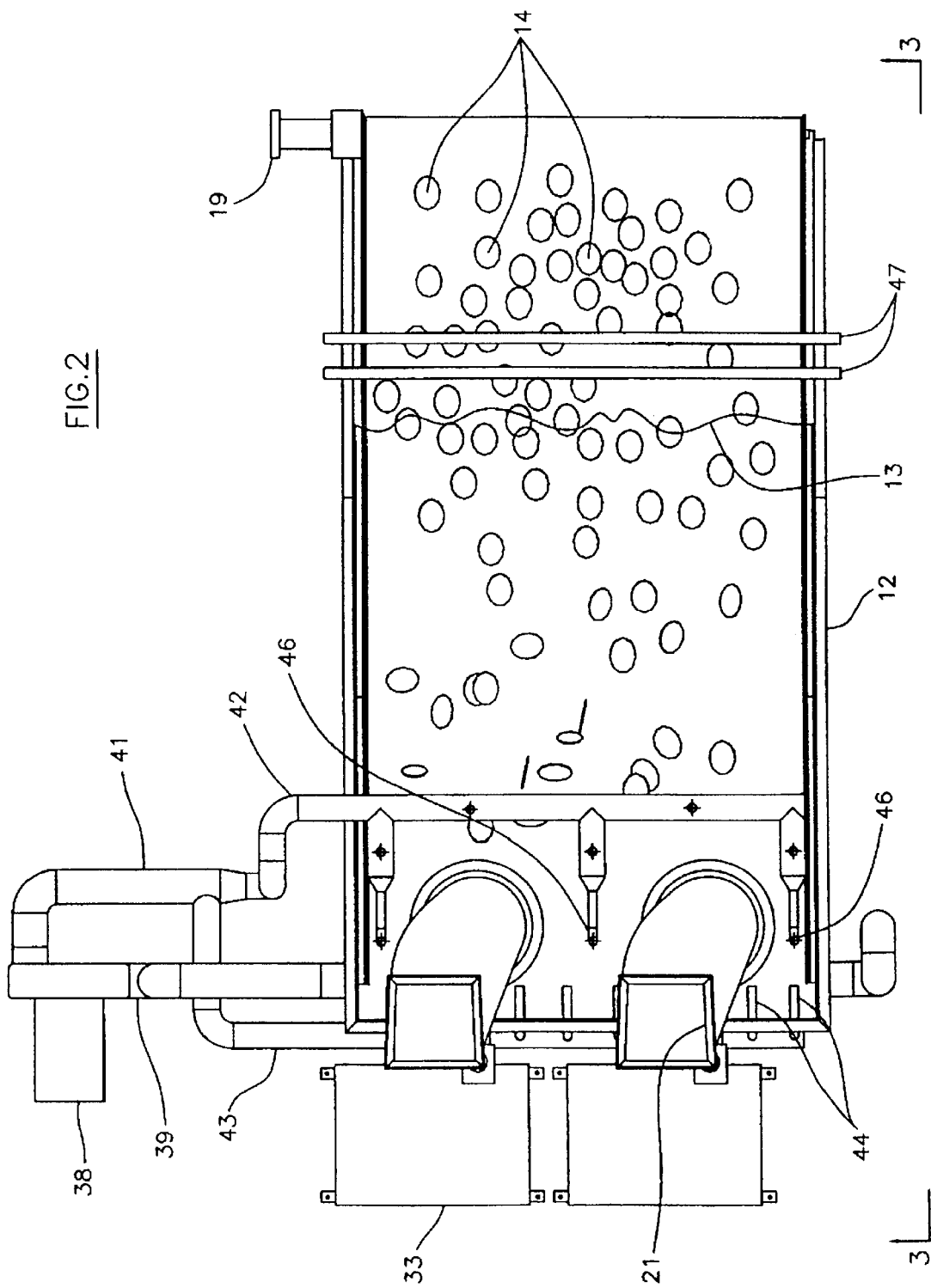
FIG. 2 is a plan view of the vegetable slicing and washing apparatus shown in FIG. 1.
Figure 3:
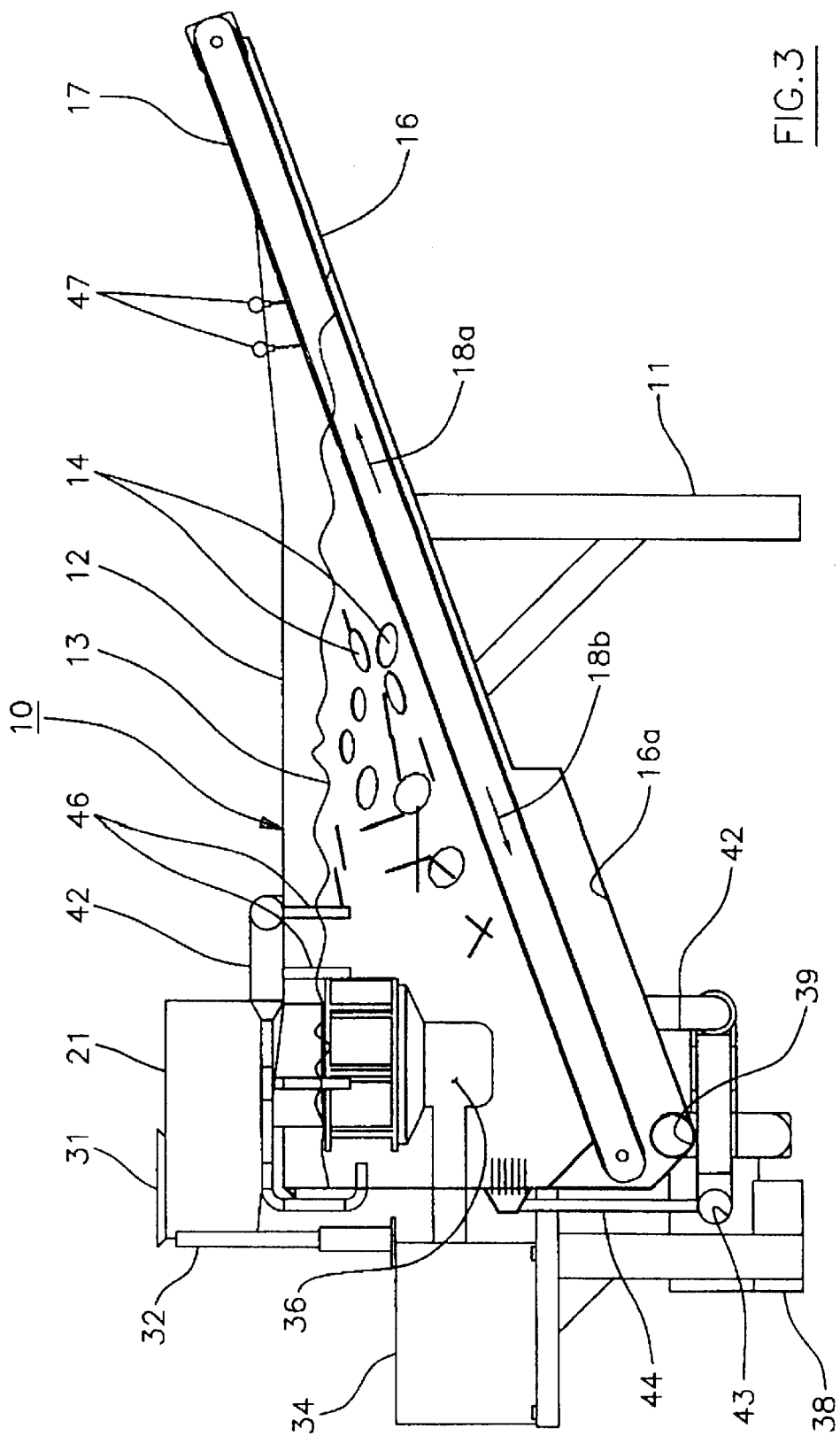
FIG. 3 is an elevation sectional view on an enlarged scale taken in the direction of the arrows 3—3 of FIG. 2.

Referring to the drawings FIGS. 1–3, there is shown a first preferred embodiment, an apparatus 10 especially adapted for carrying out the principles of the invention in simultaneously slicing and washing a vegetable product. The vegetable product may be any from the group comprising potatoes, apples, sweet potatoes, cassava, plantains, beets, onions, water chestnuts, cabbage, carrots, turnips and sugar beets. The slicer-washer apparatus 10 includes an upstanding frame 11 which supports a metal tub or bath 12 which is generally wedge-shaped in elevation as seen in FIG. 3 and, as shown in plan view in FIG. 2, is generally rectilinear. An important function of the tub 12 is to contain a body of water 13 as indicated by the wavy lines of FIGS. 1 and 3. The purpose of the water is to serve as a medium for washing broken cells, starch particles, dirt and the like from a multiplicity of vegetable slices 14 as symbolized by the oval elements in FIGS. 1–3.

A bottom wall 16 of the tub 12 is inclined upwardly as clearly shown in FIGS. 1 and 3. A sliced product take-out conveyor 17 is operatively mounted in the slicer-washer apparatus 10 to extend substantially the full length of the bottom wall 16 of the tub 12. The conveyor 17 is inclined so as to present an upper end of the conveyor to project above the side walls 12a, 12b of the tub. The conveyor 17 may receive vegetable slices 14 in the water bath 13 and will convey them in the direction of the arrows 18a upwardly and out of the water 13 to a take-away conveyor (not shown). The conveyor 17 is driven by a variable speed electric motor drive 19 so that the motion of the top conveyor runt is in the direction of the arrow 18a and the return run of the conveyor moves in the direction of the arrow 18b, shown in FIG. 3. The product take-out conveyor 17 is equipped with a belt composed of a woven wire mesh thus having substantial openings permitting a current of water to flow there through. The water circulation pattern will to be described more fully below.

A pair of powered vegetable slicer apparatus 21 may be operatively mounted at one end of the tub 12 in a manner so as to present the operative slicing mechanism or cutting head 22 submerged in the body of water 13 contained in the tub, as appears in FIG. 3. Although in the drawings of this disclosure, two vegetable slicers 21 are shown, the number may vary as conditions warrant. A single slicer may be appropriate for applications of modest capacity while 2, 3 or more slicers 21 may be appropriate for applications wherein a larger volume of sliced vegetable product is required.

Figure 4:
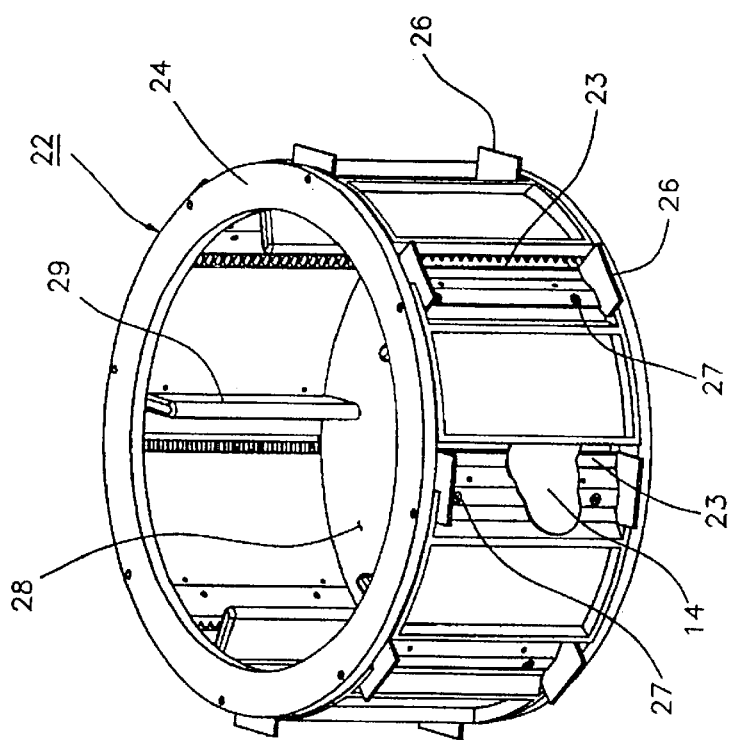
FIG. 4 is a perspective view on an enlarged scale of the stator and rotor cage of the vegetable slicer shown in FIG. 3.
Figure 5:
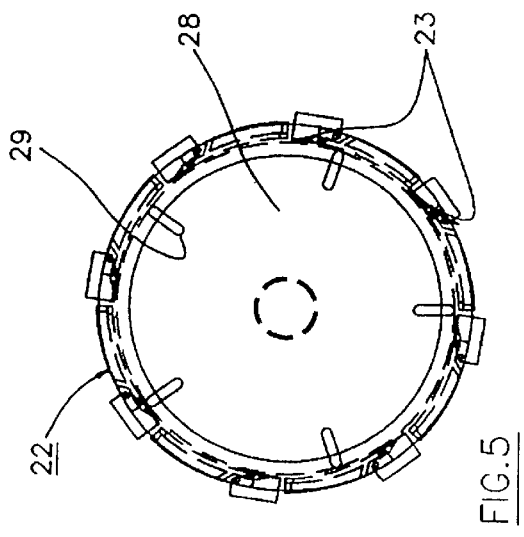
FIG. 5 is a plan view from above on a reduced scale of the stator and rotor cage assembly shown in FIG. 4.
Figure 6:
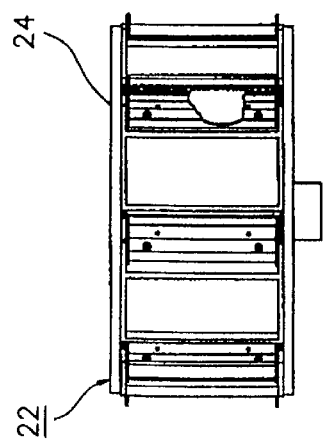
FIG. 6 is an elevation view of the stator and rotor cage assembly shown in FIG. 5.

A rotary slicer found quite suitable for the present application is Model CC, manufactured by Urschel Laboratories, Inc. of Valparaiso, Ind. 46384. To permit effective operation of the rotary slicer Model CC within the principles of the present invention, we have made certain desirable modifications. More specifically, the slicer cutting head 22 is totally exposed in the body of water 13 so that the resulting slices 14 will be unimpeded by product deflecting guards or the like. This is achieved by removal of the covers and guards which are normally mounted upon the slicer so as to protect users from contacting the cutting head and also for the purpose of directing downwardly the sliced products in the normal operation of the slicer 21. Referring to FIGS. 4–6, the cutting head 22 is equipped with a plurality of knives 23, circumferentially spaced apart with respect to a support ring 24. The individual knives 23 are held in the assembly by a knife clamp 26. Provisions are made on the cutting head 22 so as to insure that the slices 14 which exit through the cutting slots will do so in a substantially unobstructed manner to minimize deformations or bruising of the slices. More particularly, the various, normally protruding metal surfaces such as the fasteners 27 or flanges and the like are either removed or countersunk to a degree so that no metal obstruction will protrude into the path of the slice 14. For this reason the slice 14 will exit the cutting head 22 in a clean and undamaged state. In the condition when the guards are in place, as is the case where the slicer is usually operated in the "dry," the presence of the various protruding elements and fasteners is not critical. Evidentially the slice free falls through the air in a manner that avoids noticeable damaging to the sliced product. When slicing vegetables submerged in water, the opposite is true and for this reason steps are taken to provide a clear unimpeded path for the slice to emerge from the knife slot and to free fall into the surrounding water bath. This provision minimizes unacceptable damage to the slices.

It should be understood that the cutting head of the vegetable slicer comprises a stator which serves as a mounting frame for the fixed knives 23. A motor driven rotor cage 28 is mounted for rotation within the stator, the rotor cage being equipped with spaced-apart, vertically extending flights 29. These flights, arranged along the perimeter of the rotor cage, serve to engage with and drive the vegetable products with a centrifugal force with the result that the potatoes, for example, are urged into the slicing action against the fixed knives 23. The slice taken from the body of the vegetable is pushed through the knife slot and free falls into the surrounding body of water. The remainder of potato still within the rotor cage of the slicer continues in centrifugal motion and engages another stationary knife mounted in the stator whence another slice is removed from the potato to free fall into the surrounding body of water. In this action it will be apparent that the vegetables are simultaneously sliced and washed immediately upon exit from the knife slots in the cutting head 22. The rotor cage 28 operates submerged in the water bath and thereby generates some turbulence which may sometimes resemble a vortex-like current of water flow which will be discussed below.

Referring again to FIGS. 1 and 3, each slicer 21 is equipped with a feed hopper 31 into which the whole potatoes or other vegetables are deposited. The feed hopper 31 is supported by a vertically extending post 32 arranged on a box-like support 33 which serves as an enclosure for the variable speed motor drive (not shown). The motor drive unit in the slicer includes a gear reduction unit and a shaft which extends horizontally through a housing 36 (FIG. 3) and couples to a shaft for driving the rotor 28 of the cutting head 22. Thus it will be understood that in the intended operation the vegetable product is fed continuously into the slicer 21 though the feed hopper 31. The product descends by gravity into the cutting head 22 positioned in the water bath.

It will be understood, however, that due to the rotational forces applied to the cutting head, the water which may reside therein while the rotor is in the static state is driven therefrom when the working rotation of the rotor is begun. Thus the product descends into a virtually water free space immediately before the slicing action commences. There within the rotor the vegetable product is forced centrifugally by the flights 29 of the rotor and driven into the stationary knives serving to cut the vegetable progressively into individual slices 14 in the presence of water which surrounds the rotor exterior.

The slices issue immediately from the cutting head 22 and project or pass freely into the surrounding water 13 and are thus washed on all surfaces. The slices 14 in their ejection from the cutting head follow a path to sink generally downwardly in the water and finally migrate onto the take-up conveyor 17. Control of water currents in the bath is maintained so as to insure that substantially all of the slices take a path so as arrive onto the takeout conveyor. Through this action very few slices are "trapped" in back eddies for long periods in the tub during the slicing and washing operation.

A continuous, low velocity flow of water may preferably be maintained in the slicer/washer 10 to achieve a number of desired objectives. First, it is desirable to urge the slices to disperse into a somewhat broad pattern for their resulting placement onto the product conveyor 17. This is to minimize stacking of slices one upon the other when they come to rest on the conveyor. Second, water flow may be directed from jets nozzles discharging into the bath in at plurality of locations and directions; for example, in the vertical and horizontal general directions. Also, stator vanes (not shown) may be positioned at various attitudes in the bath to control the eddies. This is to overcome and counteract to a degree the vortex- like or turbulent effects in the water created by the operating action of the rotary slicer 21. We recognize that it is highly desirable to prevent the vegetable slices from stagnating in the bath from being trapped in back eddies or in the vortex like turbulence. By these steps we control the turbulence at least to the degree that substantially all of the vegetable slices come to reside rather quickly on the conveyor. Third, the constant water circulation serves to insure that vegetable particles or other debris carried into the bath will migrate into the sump 16a arranged in the bottom wall 16. The purpose is to removed these materials continuously from the system so as to maintain a relatively clean washing medium.

Referring particularly to FIGS. 1–3, the water circulation circuit or pattern includes a motor-driven centrifugal pump 38 which is arranged in the water flow circuit which includes a suction line 39. This is arranged in communication with the sump 16a (for fines removal) and the current or water flow is generally downwardly into the sump so as to create a current which passes through the wire mesh conveyor belt of the conveyor 17. The slices are urged by this current towards the belt. The output of the pump 38 is delivered into a main feed line 41 which branches into an upper feed line 42 and a lower feed line 43, best shown in FIG. 1. A plurality of risers and jet nozzles 44 are coupled to the lower feed line 43, the nozzles projecting generally horizontally into the tub 12 for discharging streams of water below the rotary slicer 21. The discharge nozzles 44 are disposed to project streams of water at controllable velocities into the general zones where vortex like turbulence is encountered by the slices. The water currents from the nozzles create a flow pattern which counters the back eddies and encourages the slices to be better distributed upon the takeout conveyor belt. Four such nozzles 44 are illustrated in FIG. 2, but the number of the nozzles and their positions may vary depending upon the energy needed to disrupt the back eddies or other turbulence which tends to trap slices.

Similarly, the upper feed line 42 is equipped with jet nozzles 46 projecting generally vertically downwardly into the body of water in which the slices are washed. The vertical nozzles 46 are disposed to project streams of water at controllable rates into the general zones where the slices tend to be entrapped whether from the turbulence generated by the rotary slicer or from various flow effects within the tank. Stator vanes may be positioned in the tank to supplement the effects of the nozzles 44, 46 and incertain instances the stator vanes may be sufficient in themselves to control the water currents and materially reduce the tendency of slices to become trapped in back eddies or dead water.

In processing plants having a standing supply of compressed air or of an inert gas supply it may be practical to substitute for the plurality of water jets disclosed above a generally similar array of gas or air jets for the purpose of urging the slices onto the takeout conveyor and to discourage the slices from a long residence such as being trapped in a dead water zone of the water bath.

As the slices are removed from the tub on the conveyor 17, they may receive a final cleaning spray from the transverse spray system 47 arranged adjacently to the discharge end of the conveyor 17 as shown in FIGS. 1–3, although this is not required in all instances. Thus, vegetable products such as potatoes having been deposited into the slicer 21 are sliced and simultaneously washed in an action wherein the slices are propelled outwardly from the slicer head into the body of water and are there stirred or mixed by the jets flowing from the nozzles 44, 46 so as to be disbursed over the conveyor belt 17 upon which they are removed from the slicer/washer 10. Immediately prior to the discharge from the conveyor 17, the slices receive a finishing spray 47 to remove any residual particles from the slice surfaces prior to further processing which includes frying or baking in apparatus wellknown in the field.

Second Preferred Embodiment

Figure 7:
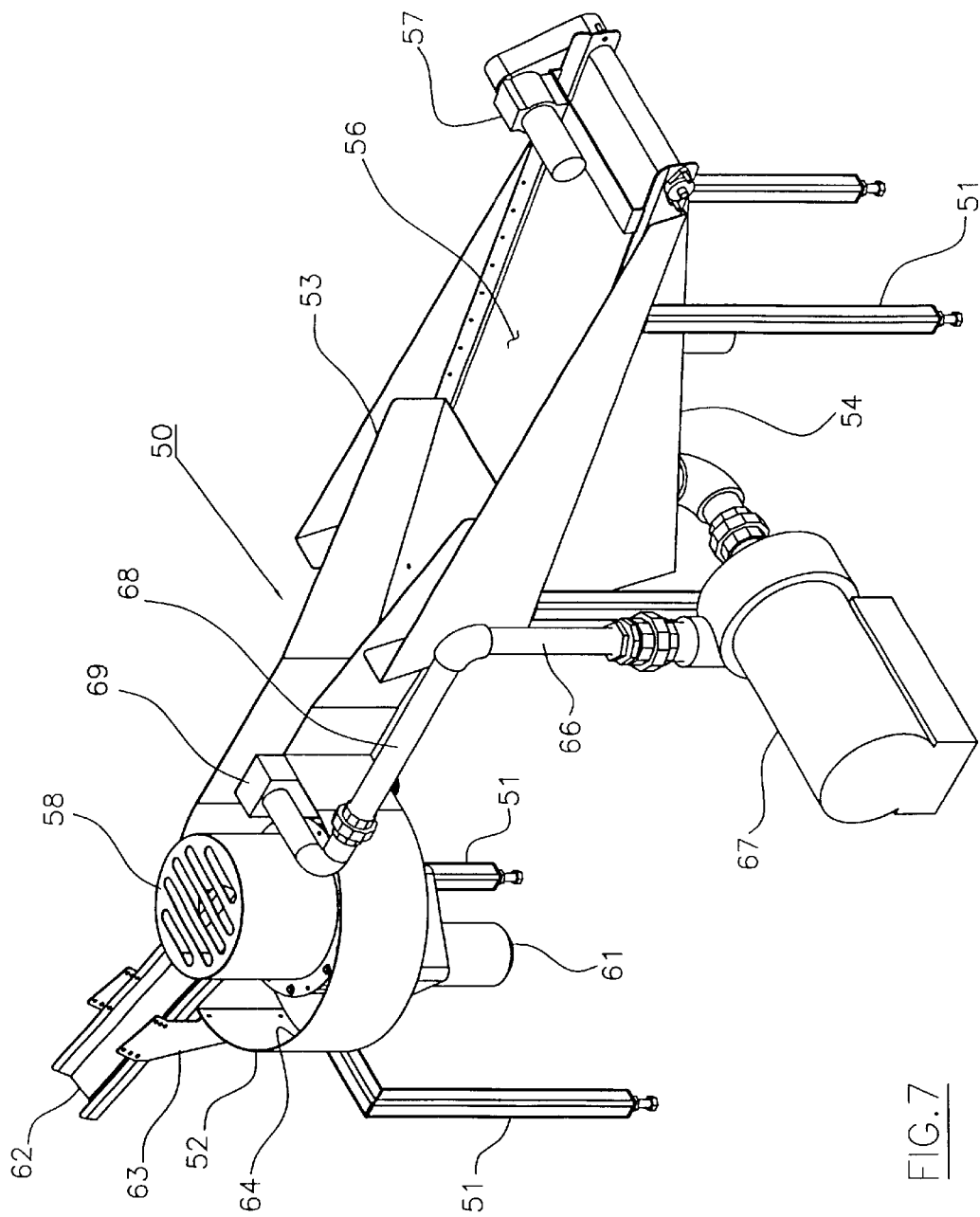
FIG. 7 is an isometric view from above showing another preferred embodiment of the invention in a vegetable slicing and washing apparatus specifically adapted for practicing the process of the present invention.
Figure 8:
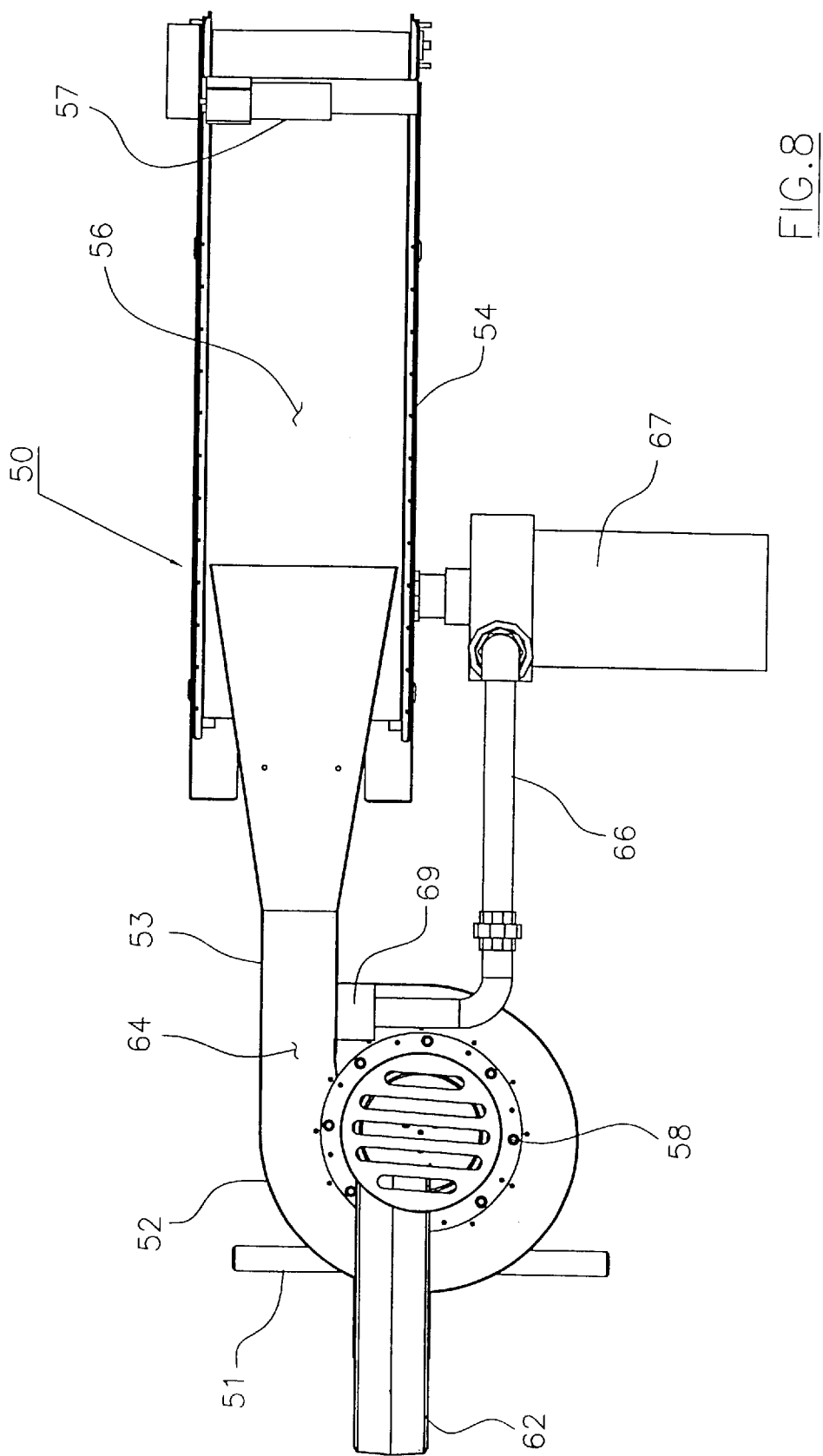
FIG. 8 is a plan view of the vegetable slicing and washing apparatus shown in FIG. 7.

A second preferred embodiment 50 of the invention for simultaneously slicing and washing vegetables is illustrated in FIGS. 7, 8 and 9. The vegetable products that can be efficiently and effectively treated in the apparatus 50 include all those listed above regarding the first preferred embodiment 10.

The slicer-washer apparatus 50 includes an upstanding frame 51 which supports a flume 52 of generally spiral or volute configuration in plan as clearly shown in FIGS. 7 and 8. A flume discharge or output trough 53 extends outwardly from the spiral or volute form and is positioned to overhang a generally wedge shaped metal tub 54 that serves to contain for recycling a body of washing liquid, preferably clear water. The configuration of the tub 54 and flume 52 is such that the top edges of the sidewalls of the flume 52 and of the tub 54 are of such a height as to permit a common water level to be maintained if that is desired. However in one mode of operation the washing action can take place principally in the flume with the run off of water and washed slices falling into the tub 54 from which the slices are removed. And it is apparent that liquid, and any slices entrained therein, flowing from the flume trough 53 will pass into the tub 54. The frame 51 also acts to support the tub 54 as indicated in FIGS. 7and 9. The water used in the system and recycled from the tub 54 serves as a medium for washing broken cells, starch particles, dirt and the like from the vegetable slices.

The bottom wall of the tub 54 is inclined upwardly as clearly shown in FIGS. 7 and 9 and a sliced product take-out conveyor 56 is operatively mounted in the tub 54 and is inclined so as to present an upper end of the conveyor 56 extending above the normal high water mark. The lower end of the conveyor 56 may be position in the tub 54 below the flume discharge trough 53 as shown in FIG. 9. Slices migrating in the water flow from the flume 52 into the tub 54 and the water bath maintained therein will be received upon the conveyor 56 and conveyed upwardly out of the water to a take-away conveying unit (not shown) for subsequent processing. The conveyor 56 is driven by a variable speed, electric motor drive 57 so that the motion and action of the top run of the conveyor will remove slices from the tub 54. The product take-out conveyor 56 is equipped with a woven wire mesh belt or the like permitting water to pass freely there through while minimizing water carry-out from the water bath within the tub 54.

Operatively mounted within the "eye" of the spiral or volute flume 52 is a vegetable slicer apparatus 58 and is arranged in a manner so as to present the operative slicing mechanism or cutting head 59 submerged below the normal operating water level maintained in the flume 52 and conjoined tub 54 as shown clearly in FIG. 9. A rotary slicer found suitable is Model CC identified above as manufactured by Urschel Laboratories, Inc. This slicer provides the stator or slicing head and rotor components incorporated in the present invention. A drive system 61 is provided to enable the slicer head to be operatively mounted directly to the bottom of the flume 52. In operation the slicer apparatus 58 is that stated above concerning the slicer 21 and the principles of operation are those mentioned above and so will not be detailed further. Suffices to mention is that upon start-up of the slicer 58 water reposing in the submerged rotor when stationery is expelled upon rotor rotation. Thus vegetable products introduced for slicing into the slicer's cutting chamber will be initially dry there but during slicing will be simultaneously instantly sliced, wetted and washed or scrubbed as the vegetable slices pass through the slicer cutting slots into the surrounding body of washing liquid within the flume 52.

The slicer drive mechanism 61 including an electric motor, gear box, etc. is arranged beneath the flume 52 as indicated in FIGS. 7 and 9.

As shown best in FIGS. 7 and 8, a downwardly inclined vegetable product feed chute 62 is mounted on the flume 52 by the gusset plates 63 positioned on opposite sides of the chute 62. If desired, adjustment means may be provided to vary the angle of the chute inclination or orientation with respect to the slicer's product reception chamber.

As viewed in FIG. 8 it will be understood that in operation the slicer rotor rotates in a clockwise direction and thereby ejects slices into the body of water surrounding the rotor. The slicer cutting head 59 is arranged spaced apart from the sidewalls of the flume, as shown, and there is thus provided a flow channel volute 64 for slice movement in a cleaning action from the slicer head 59 along a generally spiral path defined outwardly by the side wall of the flume 52. A current of water is circulated along the flow channel 64 so as to urge the slices in a washing action along a path over toward the flume discharge and slice dispersion trough 53 and thence into the take out conveyor 56 mounted in the tub 54. The slice washing water passes from the flume in a cascade of about ½ to 2 inches in depth as it moves over the lip of the dispersion trough and thence falls downwardly through the mesh belt of the take out conveyor 56 and into the water containment tub 54 for subsequent reuse in slice washing.

To this end a water re-circulation system 66 is incorporated in the apparatus 50 and includes a pump 67 having its suction inlet in communication with a water overflow pipe 71 arranged in a lower portion of the tub 54. The pump 67 discharges into the volute through a manifold 68 that is coupled to the flow nozzles 69 disposed at one end of the flow channel 64, as clearly indicated in FIGS. 7 and 8. In a recirculating operation, the pump 67 delivers a stream of water to the flow nozzles 69 positioned in the spiral or helical flow channel 64 to urge the slices into the flume trough 53 and thence into the tub 54, the pump withdrawing water from the lower portion of the tub 54 thereby creating therein a downward current through the wire mesh conveyor belt that attracts slices onto the belt of the take out conveyor 56. It will be understood from the above that the water circulation pattern and pump operation is designed to establish a water level in the flume volute sufficient to cover the rotor and stator portions of the slicer and maintain them in a submerged condition. Thus, when the slices of the vegetable product are ejected from the slicer, they are immediately scrubbed by the body of water in which they are received. The efficient and effective scrubbing action upon the vegetable slices is believed to be attributable to the relatively higher speed of the slices as compared to that of the water in the flume as the slices are propelled from the slicer into the water flowing in the volute.

Simultaneously Slicing and Cooking

Simultaneously slicing and cooking vegetables can be carried out in the apparatus disclosed herein. For example either the apparatus 10 or 50 can be charged with efficient volume of cooking oil at least to a level to cover the rotor and stator of the slicer 21, 58. Operating the slicer with vegetables introduced as mentioned above will not only clear off the broken cells from the slices but will commence the cooking of the slices. Commonly cooking oil is maintained in a temperature range of from 275 degrees F. to 450 degrees F. The tub can be directly fired so as to maintain the desired cooking temperature or a remotely located heat exchanger can be coupled to the tub 12, 54 with an appropriate piping and temperature control system (not shown). Potato slices are aptly treated in this slicing and cooking process and plantains, apples and the like may also be so treated. Upon cooking for the desired time the slices can be removed from the tub with the take out conveyor 17, 56 and passed along the processing line for the customary post cooking operations, weighing, packaging, etc. This procedure represents a substantial savings from the customary product cooking and handling equipment.

While the method for simultaneously slicing and washing vegetables as well as the method for simultaneously slicing and cooking vegetables has been described above in connection with the preferred apparatus 10 and 50 for carrying out the invention, we do not intend to limit the practice of the invention to the particular apparatus disclosed herein, but on the contrary, it is intended to cover the various alternatives, modifications and equivalent steps as may be included within the spirit and scope of the invention as defined in the appended claims.

What is claimed is:

1. A process for simultaneously slicing and washing a relatively firm, raw vegetable or fruit food product, the steps comprising:

providing a batch of the food product for slicing;

delivering the vegetable to a centrifugal slicer having a rotatable cage positioned radially inwardly of a fixed array of product slicing knives; providing a body of water to serve as a water bath and immersing the slicer therein such that the rotary cage and knives are underwater;

rotating the slicer cage with the vegetable product therein to force the food product through the knives and thence into the water bath, the slices being impelled through the water at velocity sufficient to simultaneously slice and wash starch and broken cell particles from the surfaces of the slices, and removing the slices from the water for further processing.

2. The process according to claim 1 wherein the batch of food product consists of potatoes.

3. The process according to claim 1 where the batch of food product is one from the group consisting of apples, sweet potatoes, cassava, plantains, beets, onions, water chestnuts, cabbage, carrots, turnips and sugar beets.

4. The process according to claim 1 and providing means for removing the slices from the water and wherein said slicer cage, when operatively rotating in the body of water, generates a vortex in the water tending to entrap the slices therein and further including the step of directing the slices away from the vortex and towards the means for removing the slices.

5. The process according to claim 4 wherein submerged jets of water direct the slices away from the vortex towards the product removing means.

6. The process according to claim 4 wherein submerged compressed air jets direct the slices away from the vortex towards the product removing means.

7. The process according to claim 1 wherein said slicer cage generates a vortex in the body of water tending to entrap the slices therein and further including the step of projecting submerged jets of compressed air adjacent to the vortex to encourage the slices to migrate towards product removal from the body of water.

8. The process according to claim 4 and removing the slices from the body of water along an upwardly inclined path into the air and wherein water jets are projected substantially in the direction of the path of slice removal.

9. The process according to claim 4 wherein submerged water jets are oriented to project a stream of water in a direction substantially normal to the rotor rotational axis of the slicer to urge the slices towards the slice removal means.

10. The process according to claim 4 wherein water jets are oriented to project a stream of water in a direction substantially parallel to the rotor rotational axis of the slices.

11. The process according to claim 4 wherein water jets are oriented to project a stream of water in a direction tangential to the rotor periphery.

12. A process of simultaneously washing and slicing a raw potato, the steps comprising:
furnishing a vat supplied with washing water and having an inclined takeout conveyor positioned with its lower end submerged in the water and its upper end extending above the water surface,
arranging a potato slicer with its potato supply inlet above the water surface and its potato slices discharge positioned above the lower end of the takeout conveyor and below the water surface,
supplying potatoes to the slicer through the potato supply inlet while operating the slicer causing potato slices to be discharged underwater thereby directly and forcefully cleaning the surfaces of the slices of dirt, starch and burst potato cells,
circulating the washing water in a current passing downwardly through the conveyor at a force such that the potato slices are attracted to and dispersed upon the conveyor, operating the conveyor in a direction to remove the slices from the water and the vat.

13. The process of claim 12 wherein operation of the potato slicer generates an underwater vortex tending to entrain slices therein, and controlling the vortex by impinging jets of fluid against the vortex to dislodge from the vortex the entrained slices serving to encourage the slices to disperse and lodge upon the takeout conveyor.

14. The process of claim 12 and providing jets of water circulating in the vat.

15. The process of claim 12 and providing fluid jets of an inert gas circulating in the vat.

16. A process for washing and simultaneously slicing a relatively firm fruit or raw vegetable food product, the steps comprising:
providing a batch of the food product for slicing;
providing a flume having mounted therein a centrifugal slicer equipped with a rotatable cage positioned radially inwardly of a fixed array of product slicing knives;
providing a volume of water in the flume to serve as a water bath and to set the water level so as to cover the product slicing knives;
delivering the food product to the centrifugal slicer;
rotating the slicer cage with the food product therein to force the food product through the knives and thence into the water, the slices being impelled through the water at velocity sufficient to simultaneously slice and wash starch and broken cell particles from the surfaces of the slices;
creating a flow of water from the flume for moving the food product slices therefrom in a stream of water;
receiving the stream of water and slices below the flume and recirculating the water back into the flume; and
removing the slices from the water for further processing.

17. The process according to claim 16 wherein the water returned to the flume is projected along the flume so as to urge the slices away from the slicer and to disperse them from the flume.

18. The process according to claim 16 wherein the slices are removed from the water along an upwardly inclined path into the air.

19. The process according to claim 17 wherein the water returned to the flume is projected in a direction substantially tangential to the slicer rotor.

20. Apparatus for simultaneously washing and slicing relatively firm raw food products including potatoes and fruits, comprising:
a frame;
a flume of generally circular configuration mounted on said frame and equipped with a discharge chute;
a centrifugal vegetable slicer having a slicing head operatively mounted in said flume;
a tub serving to contain a body of water mounted on said frame below said flume discharge chute;
an inclined conveyor arranged in said tub serving to receive slices from said flume discharge chute;
means for circulating a stream of water from said tub into said flume sufficient to maintain a water level in said flume to cover said slicing head; and
means for operatively driving said slicer so as to thrust slices therefrom into the surrounding water at a velocity sufficient to simultaneously slice and wash starch and broken cell particles from the surfaces of the slices.

21. The apparatus of claim 20 wherein said flume is configured as a volute.

22. The apparatus of claim 21 wherein said centrifugal slicer is mounted substantially at the axis of the volute flume with said slicer drive means disposed beneath said flume.

23. A process for simultaneously slicing and washing a relatively firm, raw vegetable or fruit food product, the steps comprising:
providing a batch of the food product for slicing;
delivering the vegetable to a centrifugal slicer having a rotatable cage positioned radially inwardly of a fixed array of product slicing knives; providing a body of water to serve as a water bath and immersing the slicer therein such that the rotary cage and knives are underwater;

rotating the slicer cage with the vegetable product therein to centrifugally force the food product through the knives at a plurality of arcuately spaced locations and thence into the water bath, the slices being impelled through the water at velocity sufficient to simultaneously slice and wash starch and broken cell particles from the surfaces of the slices, and removing the slices from the water for further processing.

* * * * *